(12) United States Patent
Herrmann et al.

(10) Patent No.: US 7,406,508 B1
(45) Date of Patent: Jul. 29, 2008

(54) CAPTURING ADVERTISING REQUESTS FROM A USER

(75) Inventors: Mark Herrmann, Boston, MA (US); Jason Yanowitz, Cambridge, MA (US)

(73) Assignee: Lycos, Inc., Waltham, MA (US)

( * ) Notice: Subject to any disclaimer, the term of this patent is extended or adjusted under 35 U.S.C. 154(b) by 1222 days.

(21) Appl. No.: 09/599,675

(22) Filed: Jun. 22, 2000

(51) Int. Cl.
G06F 15/16 (2006.01)

(52) U.S. Cl. .................. 709/217; 709/206; 709/219; 709/224; 705/14; 705/26; 463/26; 463/39; 463/42

(58) Field of Classification Search ................ 709/217, 709/219, 203, 224; 705/26–27, 14; 273/236–237; 463/1, 11–13, 26–27, 40–42, 20, 39
See application file for complete search history.

(56) References Cited

U.S. PATENT DOCUMENTS

| | | | | |
|---|---|---|---|---|
| 5,643,088 A * | 7/1997 | Vaughn et al. ............... 463/40 |
| 5,823,879 A * | 10/1998 | Goldberg et al. ............. 463/42 |
| 6,014,502 A * | 1/2000 | Moraes ...................... 709/219 |
| 6,036,601 A * | 3/2000 | Heckel ........................ 463/42 |
| 6,183,366 B1 * | 2/2001 | Goldberg et al. ............. 463/42 |
| 6,196,920 B1 * | 3/2001 | Spaur et al. .................. 463/42 |
| 6,199,106 B1 * | 3/2001 | Shaw et al. ................. 709/217 |
| 6,205,432 B1 * | 3/2001 | Gabbard et al. ............... 705/14 |
| 6,264,560 B1 * | 7/2001 | Goldberg et al. ............. 463/42 |
| 6,311,211 B1 * | 10/2001 | Shaw et al. ................. 709/206 |
| 6,519,584 B1 * | 2/2003 | Tognazzini et al. ............ 707/3 |
| 6,625,578 B2 * | 9/2003 | Spaur et al. .................. 705/14 |
| 6,712,702 B2 * | 3/2004 | Goldberg et al. ............. 463/42 |
| 6,928,615 B1 * | 8/2005 | Haitsuka et al. ............. 715/738 |
| 2001/0039546 A1 * | 11/2001 | Moore et al. ................. 707/10 |
| 2002/0013167 A1 * | 1/2002 | Spaur et al. .................. 463/11 |
| 2003/0229893 A1 * | 12/2003 | Sgaraglino ................... 725/37 |
| 2005/0148377 A1 * | 7/2005 | Goldberg et al. ............. 463/12 |

* cited by examiner

Primary Examiner—LaShonda T Jacobs
(74) Attorney, Agent, or Firm—Fish & Richardson P.C.

(57) ABSTRACT

A system in which a user accessing a web environment can request advertising information without leaving the currently displayed web page. A server is communicatively coupled to a client device, such as a personal computer, and is configured to communicate content to the client device for display to the user. The content includes media, such as a web-based interactive game, an advertisement and an input area for requesting advertising information. One or more software modules executing in an operating environment provided by the server are configured to receive input from the client device when a user interacts with the media, such as taking a turn in the interactive game. The software modules communicate advertising information to the user, such as sending an email message, based on the received input, thereby allowing the user to request advertising information without interrupting his or her interaction with the currently displayed media.

26 Claims, 6 Drawing Sheets

60

From: TellMeMore@Gamesville.com
Sent: Thursday, June 15, 2000 2:38 PM
To: PlayerXYZ
Subject: Lycos Gamesville's Tell Me More Email : <u>Basketball shoes</u>

Greetings from Gamesville:

Here is the advertsing information you requested:

62

At XYZ corporation, we provide the highest quality basketball shoes in a wide range of styles and colors. At your convienence, more information is available at http://www.xyz.com

*********************************************************

About Tell Me More Email from Lycos Gamesville

You received this Email because you marked the Tell Me More check box while playing a game at: http:www.Gamesville.com Although Lycos Gamesville is sending this email to you, we are not responsible for the advertisers' content and makes no warranties or guarantees about the products or services advertised.

Thanks for your support. Contact us anytime at help@gamesville.com

Gamesville(r)
http://www.gamesville.com
"Wasting your time since 1996."

FIG. 5

CAPTURING ADVERTISING REQUESTS FROM A USER

TECHNICAL FIELD

This invention relates to techniques for capturing and servicing advertising requests from a user.

BACKGROUND

The Internet is a collection of integrated networks spanning the world and includes hundreds of thousands of online environments, such as a web sites and chat rooms. These environments are collectively referred to as the World Wide Web (WWW) and provide a myriad of online services such as search engines, interactive games, chat rooms, auctions, and retail sites to list a few.

There are several software applications, called web browsers, by which a user can easily navigate the World Wide Web, and access the online environments. Modern web browsers can present a wide range of multimedia including text, graphics, audio and video. Using a web browser, a user can jump from one destination to another by selecting one of the embedded references, also referred to as links. In this manner, the user navigates the World Wide Web, jumping from one destination to another.

One of the primary revenue generators for the Internet is the sale of advertising space on popular web sites. When the user accesses a web site and views an electronic advertisement for a product or service of interest, the user can view more information by simply clicking on the electronic advertisement. An embedded link associated with the advertisement directs the user to another web page that further describes the advertised product or service. Typically a different online environment, often the company marketing the offered product or service, provides the second web page.

SUMMARY OF THE INVENTION

The conventional process for viewing advertising information for products or services of interest can often interrupt a user's interaction with the current web environment. Being redirected to another web site or having a window pop up in front of the current window of the web browser may be annoying and unacceptable to the user, depending upon the nature of the current web environment being accessed. For example, consider an online gaming site. Because many online games require that a user respond within a certain time, a user playing an online game might not be able to pursue an interesting advertisement displayed during the game. In general, the invention allows a user to easily request advertising information without requiring that the user jump to a new web page or otherwise interrupt his or her interaction with the web environment. As such, the user can easily request advertising information while playing a web-based game, viewing real-time stock quotes, scanning search results or reading current news without effecting his or her activities.

According to one aspect, the invention is directed to a method in which a web browser displays electronic content including media, such as an interactive game, an advertisement and an input area, such as a check box. Input from the input area is captured while the user interacts with the media, such as playing a card or firing a weapon in a role playing game. Advertising information is communicated to the user based on the captured input, such as by sending an electronic mail message (email) to the user, thereby allowing the user to continue interacting with the current web environment.

In another aspect, the invention is directed to a system in which a server is communicatively coupled to a client device, such as a personal computer, and is configured to communicate content to the client device for display to the user. The content includes media, such as a web-based interactive game, an advertisement and an input area for requesting advertising information. One or more software modules executing in an operating environment provided by the server are configured to receive input from the client device when a user interacts with the media, such as taking a turn in the interactive game. In addition to processing the user interaction, the software modules process the input and determine whether to communicate advertising information to the user based on the received input. In this manner, the user can request advertising information without interrupting his or her interaction with the currently displayed media.

Various embodiments of the invention are set forth in the accompanying drawings and the description below. Other features and advantages of the invention will become apparent from the description, the drawings, and the claims.

BRIEF DESCRIPTION OF THE DRAWINGS

FIG. 5 is an example electronic mail message containing advertising information.

DETAILED DESCRIPTION

Figure 1:
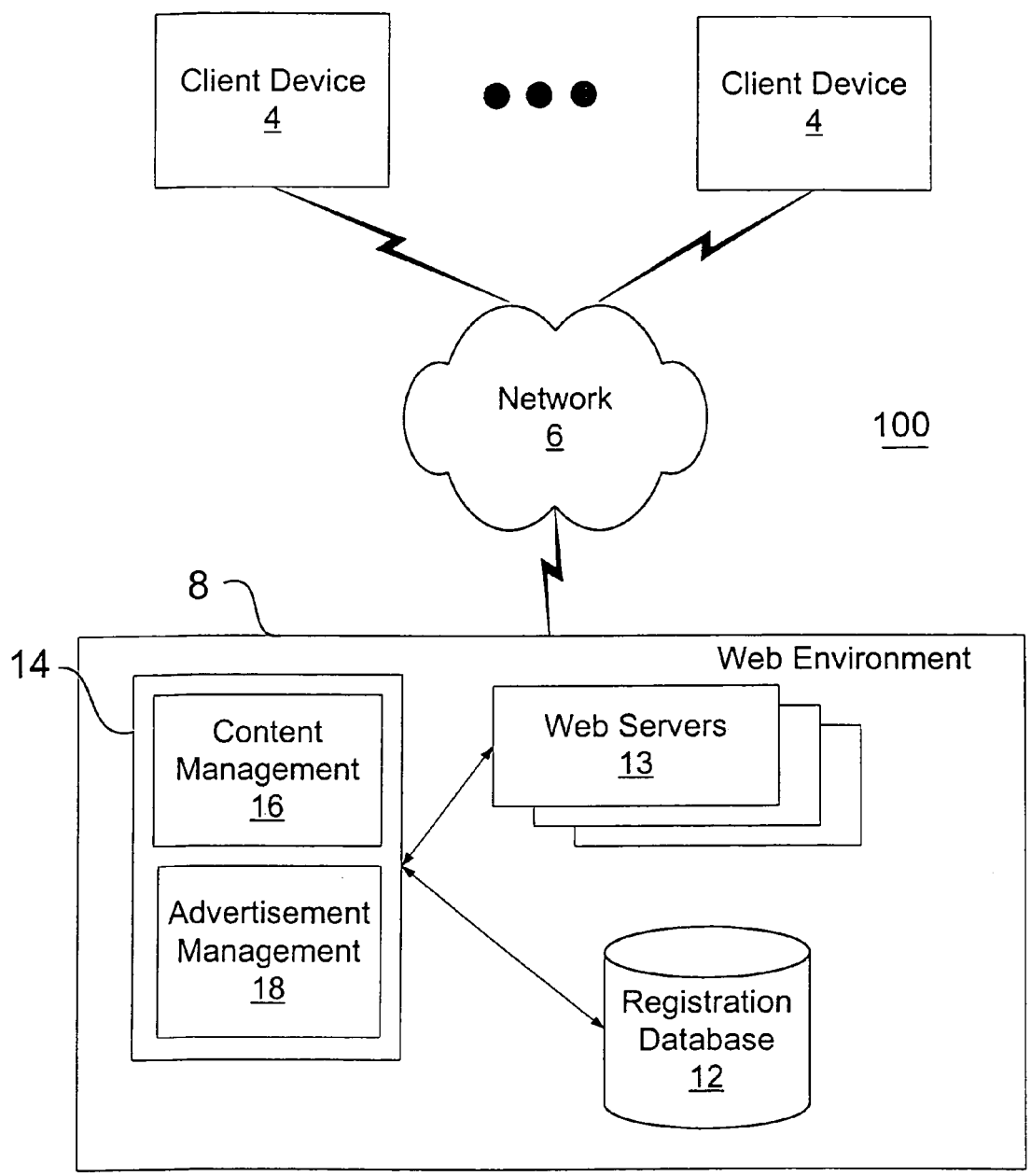
FIG. 1 is a block diagram illustrating an example of a system in which users can request advertising information without interrupting their interaction with online environments.

FIG. 1 is a block diagram illustrating a system 100 in which users can request advertising information without interrupting their interaction with web environments. Generally, system 100 includes a number of client devices 4 that are coupled to environments 8 via network 18. Client devices 4 represent general purpose computing systems suitable for interacting with environment 8 via network 6. One example of a suitable client device 4 is a personal computer. In addition, client devices 4 can be a laptop computer, a handheld computer, a personal digital assistant (PDA), such as a Palm™ organizer from Palm Inc. of Santa Clara, Calif., or a network-enabled cellular telephone. Each client device 4 provides an operating environment for executing a web browser, such as Internet Explorer™ from Microsoft™ Corporation of Redmond, Wash., that allows a user to remotely access environment 8 by network 6. Network 6 represents any communication network, such as a packet-based digital network like the Internet.

Web environment 8 represents any web-based environment such as a web site, a chat room or other environment that provides content viewable via a web browser. For example, environment 8 can be a gaming web site that offers a number of online, interactive games. Other examples of web services represented by online environment 8 include search engines, interactive games, chat rooms, auctions, and retail sites, to list a few.

Web environment 8 includes one or more web servers 13 that provide interfaces for communicating with client devices 4 via network 6. In one configuration, web servers 13 execute web server software, such as Internet Information Server™ from Microsoft Corporation, of Redmond, Wash. In another configuration, web servers 26 execute Websphere Application Server™ on a Domino™ Server from International Business Machines Corporation (IBM) of Armonk, N.Y. Web servers 13 provide an environment for interacting with users according to software modules 14, which can include Java scripts, Java Applets, Active Server Pages, web pages written in hypertext markup language (HTML) or dynamic HTML, Active X modules, and other suitable modules for configuring web servers 13.

Generally, software modules 14 can be grouped into two categories. Content management modules 16 generate and format the content that is communicated to client devices 4 for display to the user. In addition, content management modules 16 process user input received from client devices 4, such as information submitted via an HTML form. Advertisement management modules 18, as explained below, process requests for advertisement information and deliver the information to the user.

In order to process the requests for advertisement information, software modules 14 interact with registration database 12 to retrieve additional user information. Registration database 12 stores a user identification (ID), a password, an email address and other common demographic information such as the user's address and billing information. In one configuration, registration database 12 comprises a relational database management system (RDBMS) executing on one or more database servers.

Figure 2:
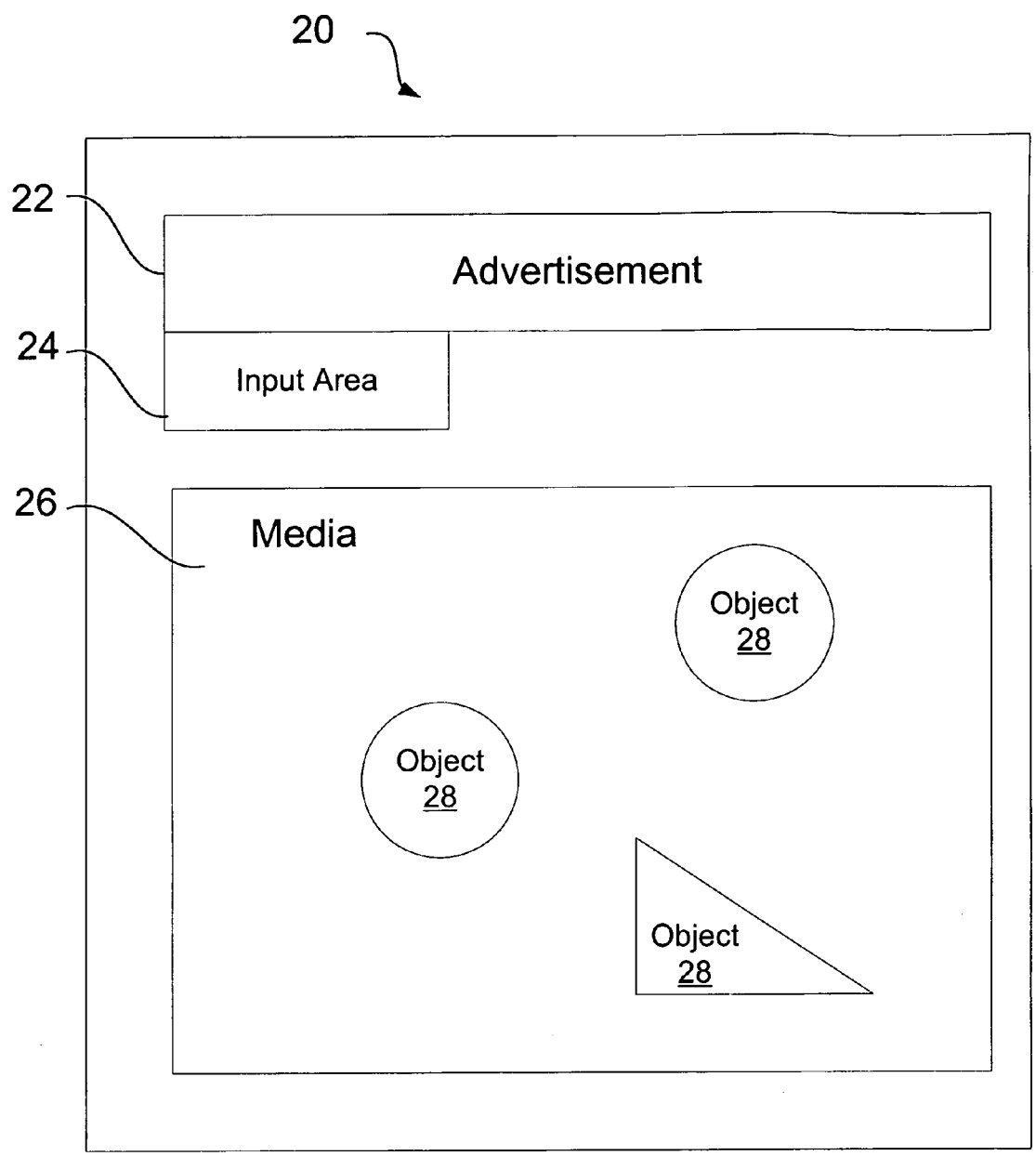
FIG. 2 is a block diagram illustrating an example of a web page displayed by a web browser.

As explained in detail below, the features of the invention allow users to express an interest in a visible element, such as a desire to receive advertising information, without requiring the user to click on the visible element. FIG. 2 illustrates a simple example of a window 20 presented by a web browser executing on a client device 4 when the user accesses web environment 8. Window 20 displays a number of visible elements including advertisement 22, associated input area 24 and media 26. As illustrated in FIG. 2, these visible elements may be spatially separated when on the displayed web page. Alternatively, any of the elements may overlap with the other elements. For example, input area 24 may be displayed as part of advertisement 22 or media 26. Similarly, advertisement 22 and input area 24 can be displayed within media 26.

Media 26 represents any media displayed in a web such as an electronic game, news articles, stock reports, and financial information. As such, media 26 includes a number of objects 28 that generally represent any area within media 26 with which the user may interact. For example, objects 28 may be forms for submitting information, links to other web pages, buttons, drop down boxes, icons, virtual items within a game or within three-dimensional (3D) a virtual world.

Advertisement 22 represents an electronic advertisement such as a banner advertisement or other graphic. The user can express an interest in advertisement 22 without necessarily clicking on advertisement 22. Instead, the user can enter information in input area 24 and continue to interact with media 26 in normal fashion. When the user interacts with one of the objects 28 within media 26, the web browser captures any information in input area 24 and communicates the information to the environment 8. Based on the captured information, environment 8 determines whether to send the user an electronic mail message containing relevant advertising information, or otherwise service the user's interest. In this manner, the user can express an interest in a visible element, such as advertisement 22, interrupting his or her interaction with media 26. This is particularly advantageous when there is a time sensitive component to media 26, as is typical with online games where the user must respond in a limited time.

Below is sample HTML code that further illustrates how the above-described functionality can be implemented:

```
<HTML>
<HEAD>
<TITLE>The Bingo Zone(r): GAME</TITLE>
</HEAD>
<BODY  TOPMARGIN=0 BOTTOMMARGIN=0 BGCOLOR=#ffffff0>
   ...
<!-- Start ad insert -->
<FORM ACTION="http://www.nineco.com:
1967/cgi-bin/clickAd" METHOD=GET
target="_blank">
<A HREF="http://www0.nineco.com:1967/cgi-
bin/clickAd?acct=6&subacct=3&type=1&U=player3&P=password"
TARGET="_blank">
<IMG SRC="http://www0.nineco.com:1967/art_ad/6_3_b.gif"
HEIGHT=60 WIDTH=468 BORDER=0 ALT="The Bingo Bugle">
</form>
<!-- End ad insert -->
   ...
<!-- Start of the input area-->
<FORM NAME=form1 ACTION="http://www0.nineco.com:
1967/cgi-bin/bingo-play" METHOD=post>
<INPUT TYPE=HIDDEN NAME=adEmailContext VALUE=1>
Email me more information about this ad
<INPUT TYPE=HIDDEN NAME=adEmailAcct VALUE=6>
<INPUT TYPE=CHECKBOX NAME=adEmailMe VALUE=yes>
<!-- End of the input area-->
<!---- start Media (game) ---->
   ...
<!--One object that the user can click and trigger processing input -->
<!--This allows a user to request more balls in a bingo game -->
<TD ALIGN=RIGHT VALIGN=TOP
WIDTH=60><INPUT TYPE=IMAGE ALT="more balls"
SRC="art_tbz/tbz_button_more_balls.gif"
WIDTH=55 HEIGHT=70 NAME=13
BORDER=0></TD>
<!-- End of media -->
   ...
</FORM>
</BODY>
</HTML>
```

Notably, the above HTML code uses standard HTML <FORM> tags to create two distinct form is for receiving input with the web page. The first <FORM> tag, and the corresponding ending </FORM> tag, create a first form that surrounds the advertisement itself. This form is useful for supporting conventional functionality such that when the user clicks on the advertisement 22, the web browser directs the user to a second web page containing the associated advertising information. However, a second <FORM> tag, and a corresponding ending </FORM> tag, is used to define a form that encompasses input area 24, media 26 and objects 28. The second form is configured such that user interaction with objects 28 triggers web browser to capture information from input area 24.

Figure 3:
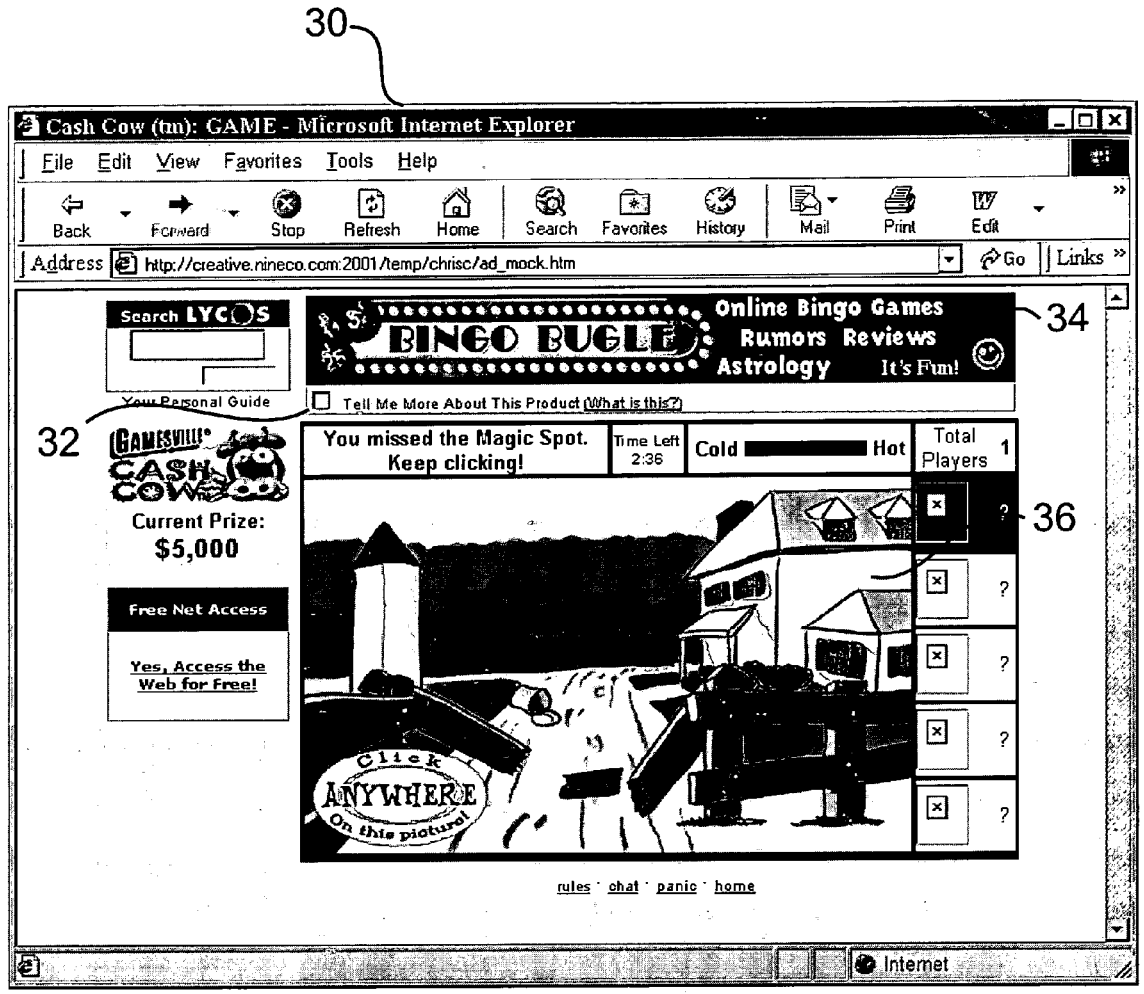
FIG. 3 illustrates a more detailed example of a web page presented by a web browser.

FIG. 3 illustrates a more detailed example of a window 30 presented by a web browser executing on client device 4. Window 30 includes advertisement 34, an associated input area 32 and media 36. In this example, media 36 is a game in which the user has limited time to find a secret location. The user can easily obtain advertising information by simply checking the box within input area 32. When the user clicks anywhere within media 36 in an attempt to find the hidden location, the web browser captures information in input area 32 and communicates the information to environment 8.

Figure 4:
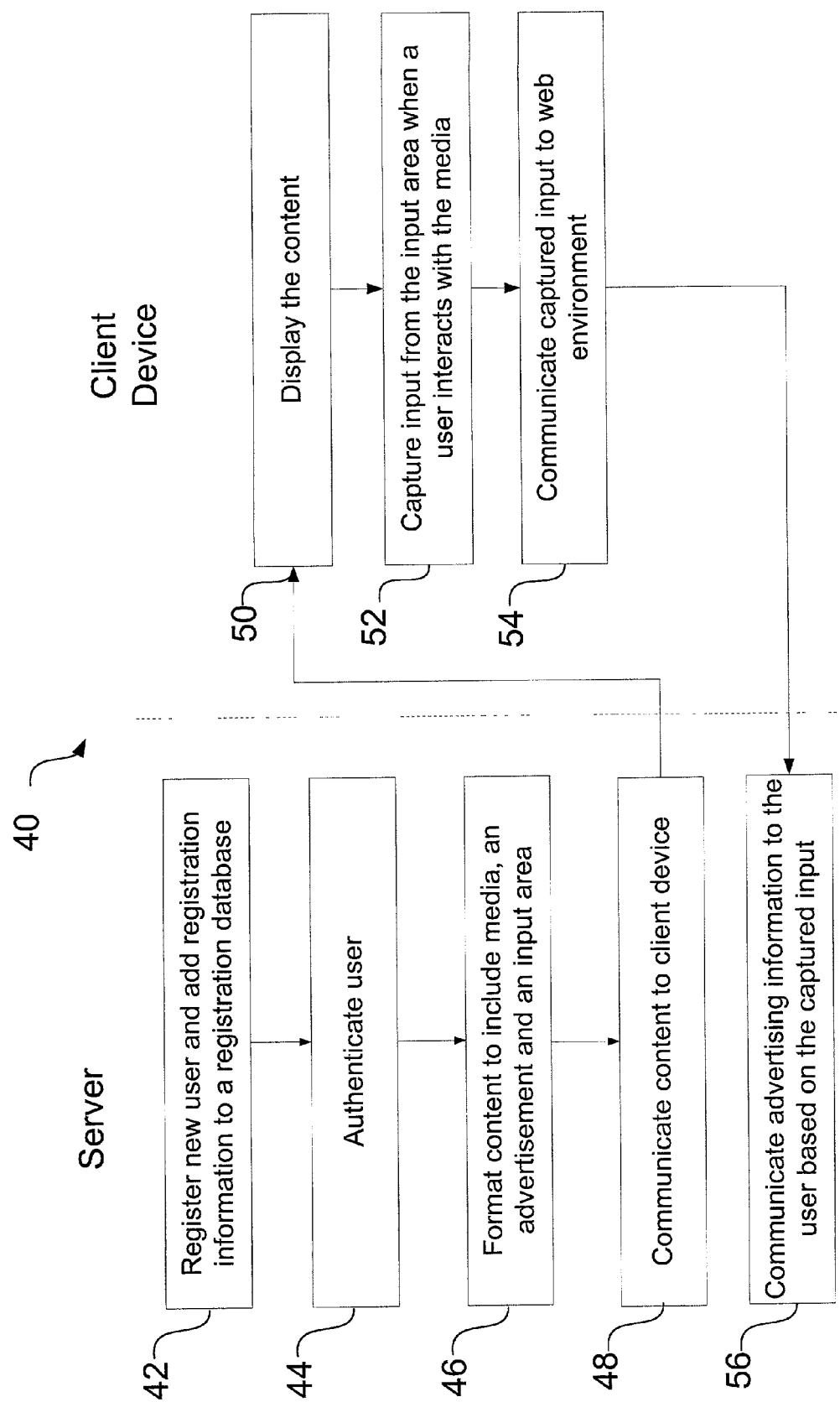
FIG. 4 is a flowchart illustrating an example process according to the invention.

FIG. 4 is a flow chart illustrating one implementation of a process 40 in which client device 4 and environment 8 cooperate to provide advertising information to the user. Initially, software modules 14 of environment 8 receive registration information for a new user and store the registration information within registration database 12 (step 42). Thereafter, the user is authenticated whenever he or she accesses environment 8 based on a user identification number (ID) and a password (step 44).

After environment 8 authenticates a user, software modules 14 format content to include media, such as an interactive game, an advertisement, and an associated input area (step 46). As described above, the content is formulated to have two distinct forms, one encompassing the advertisement and one encompassing the input area and the media. Web servers 14 communicate the content to appropriate client device 4 for display to the user (step 48). Typically, web server 14 communicates the content to client device 4 via network 8 using the hypertext transfer protocol (HTTP). Client device 4 receives the content and presents the content to the user such that the media, the advertisement and the input area are concurrently displayed (step 50).

Upon receiving an interaction with the presented media, such as a click with a pointing device, the web browser captures information from the displayed input area (step 52). As described above, in one configuration the input area is simply a check box that the user can select. In another configuration, the input area can be a text box in which the user enters his or her email address. Other example inputs include radio buttons, drop down boxes, combo boxes or any other suitable input mechanism. The web browser communicates the information captured from the input area, and information regarding the user's interaction with the media, to environment 8 for processing (step 54). Upon receiving the information, in addition to processing the user's interaction with the media, software modules 14 of environment 8 determine whether the user has requested additional advertising information and communicates the advertising information to the user (step 56). When the input area is a simple check box, advertisement management modules 18 retrieve the user's email address from registration database 12 and send the user an electronic email message containing the advertising information. Alternatively, if the user has entered an email address in the input area, advertisement management modules 18 need not access registration database 12. FIG. 5 illustrates an example electronic mail message 60 containing advertising information 62 as requested by the user.

Figure 6:
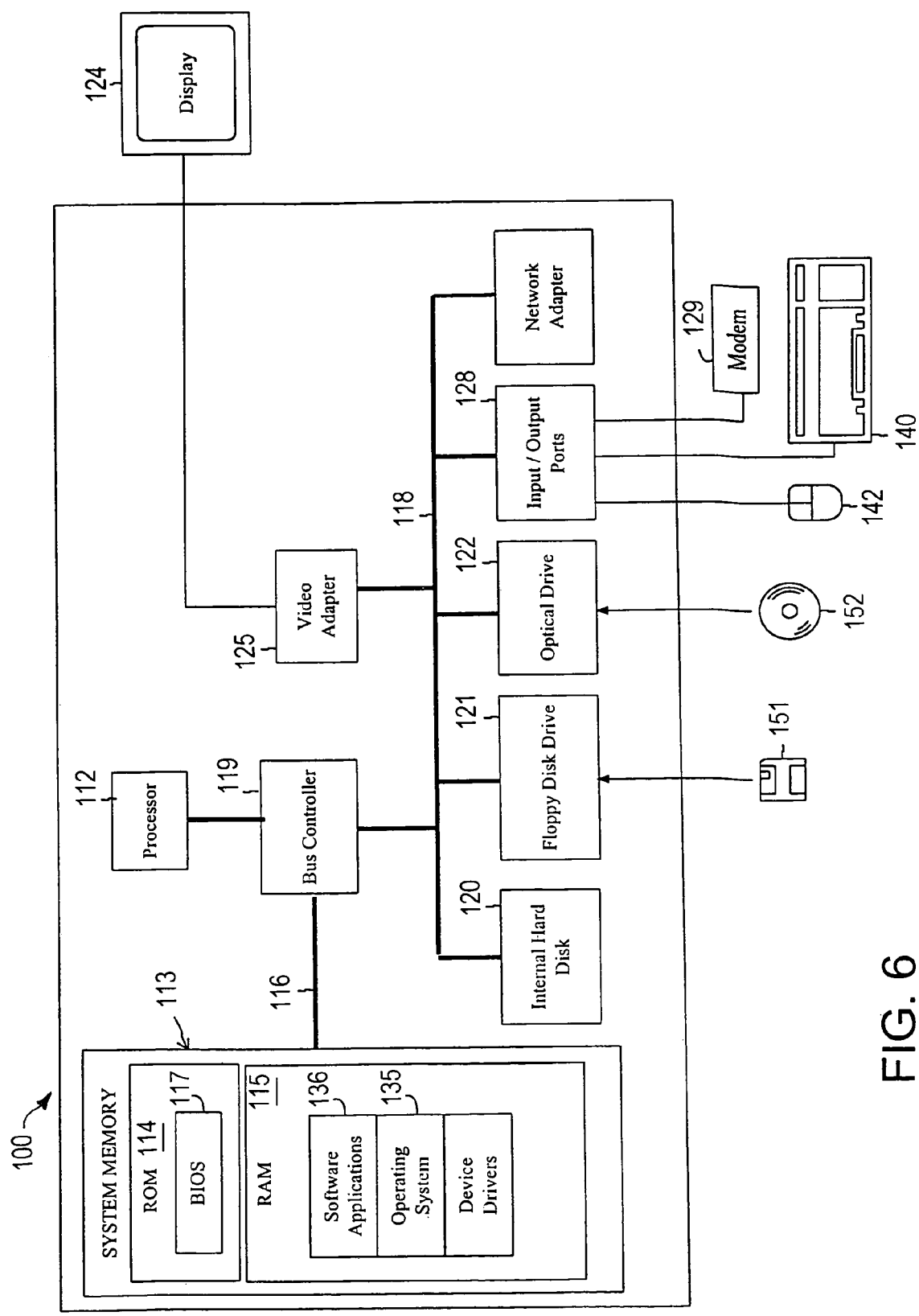
FIG. 6 is a block diagram illustrates one embodiment of a computer suitable for implementing the various embodiments of the invention.

FIG. 6 illustrates a programmable computing system (system) 100 that provides an operating environment suitable for use as a client device 4 or as a server within environment 8. System 100 includes a processor 112 that in one embodiment belongs to the PENTIUM® family of microprocessors manufactured by the Intel Corporation of Santa Clara, Calif. However, the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. In various configurations, system 100 represents any server, personal computer, laptop or even a battery-powered, pocket-sized, mobile computer known as a hand-held PC or personal digital assistant (PDA).

System 100 includes system memory 113, including read only memory (ROM) 114 and random access memory (RAM) 115, which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the system 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

Users enter commands and information into the system 100 by using a keyboard 140 and/or pointing device, such as a mouse 142, which are connected to bus 118 via input/output ports 128. Other types of pointing devices (not shown) include track pads, track balls, joysticks, data gloves, head trackers, and other devices suitable for positioning a cursor on the video display 124.

System 100 also includes a modem 129. Although illustrated as external to the system 100. Modem 129 may also be internal to the system 100. The modem 129 is typically used to communicate over wide area networks (not shown), such as the global Internet. Modem 129 may be connected to a network using either a wired or wireless connection.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once one of the software applications 136 is loaded into the RAM 115, it can be used by the processor 112. In case of large software applications 136, processor 112 loads various portions of program modules into RAM 115 as needed.

The Basic Input/Output System (BIOS) 117 for the system 100 is a set of basic executable routines that have conventionally helped to transfer information between the computing resources within the system 100. Operating system 135 or other software applications 136 use these low-level service routines. In one embodiment system 100 includes a registry (not shown) that is a system database that holds configuration information for system 100. For example, the Windows® operating system by Microsoft Corporation of Redmond, Wash., maintains the registry in two hidden files, called USER.DAT and SYSTEM.DAT, located on a permanent storage device such as an internal disk.

Various embodiments have been described in which a user may express an interest in a visible element of a web page without requiring that the user click on the visible element, thereby allowing the user to continue interacting with the current environment. The invention has been described in terms of particular embodiments, such as an embodiment in which a user to easily can request advertising information by checking a box and continuing to interact with the current web environment. Other embodiments are within the scope of the following claims.

What is claimed is:

1. A system comprising:
    a server communicatively coupled to a client device and configured to communicate content to the client device for display to a user, wherein the content includes information relating to an interactive activity and information relating to an advertisement, the interactive activity being encompassed by a first form that is separate from a second form that encompasses the advertisement, the first form including an input area for providing an input for use in obtaining additional information relating to the advertisement, the first form being configured so that user interaction with the interactive activity triggers a web browser to capture information from the input area; and
    one or more software modules executing in an operating environment provided by the server and configured (a) to receive the input from the client device in response to the user interaction with the interactive activity, the input being received, in a single transmission, along with information relating to user participation in the interactive activity, and (b) after receiving the input, to provide to the user additional information relating to the advertisement and to communicate content to the client relating to the interactive activity.

2. The system of claim 1, further comprising a registration database to store user information.

3. The system of claim 2, wherein the server is configured to store registration information for the user within the registration database prior to communicating the content to the client device.

4. The system of claim 2, wherein the server is configured to retrieve registration information from the registration database when sending the advertising information to the user.

5. The system of claim 1, further comprising the web browser executing in an operating environment provided by the client device, wherein the web browser is configured to display the interactive activity to the user.

6. The system of claim 1, wherein the interactive activity comprises a web-based computer game.

7. The system of claim 1, wherein the input area includes a check box and the server is configured to communicate the advertising information to the user when the received input indicates a user has marked the check box.

8. The system of claim 1, wherein the server is configured to extract an email address from the input area and to send the advertising information to the user by an electronic mail message.

9. A method comprising:
    causing display of a user interface to permit a user to participate in an interactive activity;
    during display of the user interface, causing display of advertising information on the user interface without interfering with the user's ability to participate in the interactive activity, the interactive activity being separate from the advertising information;
    wherein the interactive activity is encompassed by a first form and the advertising information is encompassed by a second form, the first form including an input area for providing an input for use in obtaining additional information relating to the advertising information, the first form being configured so that user interaction with the interactive activity triggers a web browser to capture information from the input area;
    during display of the user interface, receiving from a computer associated with the user a first signal via the input area indicating an interest in receiving additional information related to the advertising information; and
    causing said additional information related to the advertising information to be provided to the computer associated with the user in response to the first signal, without interfering with the user's ability to participate in the interactive activity;
    wherein the first signal is received in response to the user's interaction with the interactive activity.

10. The method of claim 9 wherein the interactive activity comprises a game; and
    wherein the advertising information is displayed during the game, the first signal is received from the computer associated with the user during the game, and the additional information is provided to the user without interrupting the game.

11. The method of claim 9, wherein the user interface is provided by the computer associated with the user, the computer being connected over a network to a server computer.

12. The method of claim 9, wherein causing said additional information to be provided to the computer associated with the user includes causing an electronic mail message to be sent to the user.

13. The method of claim 9, wherein the first signal is generated in response to the user checking a check box in the user interface.

14. The method of claim 9, further including registering the user prior to displaying the user interface.

15. The method of claim 14, wherein causing the additional information related to the advertising information to be provided to the computer associated with the user in response to the first signal, without interrupting the user's ability to participate in the interactive activity, includes causing registration information for the user to be retrieved.

16. The method of claim 9, wherein causing the additional information related to the advertising information to be provided to the computer associated with the user in response to the first signal, without interrupting the user's ability to participate in the interactive activity, includes capturing an email address of the user.

17. A software product stored on a computer readable medium having instructions for causing a computer to:
    cause display of a user interface to permit a user to participate in an interactive activity;
    during display of the user interface, cause display of advertising information on the user interface without interfering with the user's ability to participate in the interactive activity, the interactive activity being separate from the advertising information;
    wherein the interactive activity is encompassed by a first form and the advertising information is encompassed by a second form, the first form including an input area for providing an input for use in obtaining additional information relating to the advertising information, the first form being configured so that user interaction with the interactive activity triggers a web browser to capture information from the input area;

during display of the user interface, receive from a computer associated with the user a first signal indicating an interest in receiving additional information related to the advertising information; and cause said additional information related to the advertising information to be provided to the computer associated with the user in response to the first signal, without interfering with the user's ability to participate in the interactive activity;

wherein the first signal is received in response to the user's interaction with the interactive activity.

18. The software product of claim 17 wherein the interactive activity comprises a game; and wherein the advertising information is displayed during the game, the first signal is received from the computer associated with the user during the game, and the additional information is provided to the user without interrupting the game.

19. The software product of claim 17, wherein the user interface is provided the computer associated with the user, the computer associated with the user being connected over a network to a server computer.

20. The software product of claim 17, wherein instructions for causing a computer to cause said additional information to be provided to the computer associated with the user includes instructions for causing an electronic mail message to be sent to the user.

21. The software product of claim 17, further comprising instructions for generating the first signal in response to the user checking a check box in the user interface.

22. The software product of claim 17, further comprising instructions to register the user prior to displaying the user interface.

23. The software product of claim 22, wherein instructions for causing a computer to cause the additional information related to the advertising information to be provided to the computer associated with the user in response to the signal, without interrupting the user's ability to participate in the interactive activity, comprises instructions for causing a computer to cause registration information for the user to be retrieved.

24. The method of claim 17, wherein instructions for causing a computer to cause the additional information related to the advertising information to be provided to the computer associated with the user in response to the signal, without interrupting the user's ability to participate in the interactive activity, comprises instructions for causing the computer to capture an email address of the user.

25. A method comprising:

displaying information about an interactive activity to a user on a display associated with a client computer;

receiving at the client computer a request for advertising information and information related to the user's participation in the interactive activity, the interactive activity being encompassed by a first form that is separate from a second form that encompasses the advertising information, the first form including an input area for providing an input for receiving the request for advertising information, the first form being configured so that user interaction with the interactive activity triggers a web browser to capture information from the input area;

simultaneously transmitting to a server the user's request for advertising information from the input area and the information related to the user's participation in the interactive activity, wherein transmitting is performed in response to the user's interaction with the interactive activity; and receiving the advertising information at the client computer without interfering with the user's ability to participate in the interactive activity.

26. A system comprising:

means for causing display of a user interface to permit a user to participate in an interactive activity;

means for, during display of the user interface, causing display of advertising information on the user interface without interfering with the user's ability to participate in the interactive activity, the interactive activity being separate from the advertising information;

wherein the interactive activity is encompassed by a first form and the advertising information is encompassed by a second form, the first form including an input area for providing an input for use in obtaining additional information relating to the advertising information, the first form being configured so that user interaction with the interactive activity triggers a web browser to capture information from the input area;

means for, during display of the user interface, receiving from a computer associated with the user a first signal indicating an interest in receiving additional information related to the advertising information; and means for causing said additional information related to the advertising information to be provided to the computer associated with the user in response to the first signal, without interfering with the user's ability to participate in the interactive activity;

wherein the first signal is received in response to the user's interaction with the interactive activity.

* * * * *